United States Patent
Hackl et al.

(10) Patent No.: US 8,702,410 B2
(45) Date of Patent: Apr. 22, 2014

(54) DEVICE FOR COOLING PLASTIC PROFILES

(75) Inventors: Leopold Hackl, Katzelsdorf (AT); Josef Dobrowsky, Tullnerbach (AT); Georg Zacher, Vienna (AT); Miron I. Gorilovskiy, Moscow (RU)

(73) Assignee: battenfeld-cincinnati Austria GmbH, Vienna (AT)

( * ) Notice: Subject to any disclaimer, the term of this patent is extended or adjusted under 35 U.S.C. 154(b) by 303 days.

(21) Appl. No.: 13/062,885

(22) PCT Filed: Sep. 10, 2009
(Under 37 CFR 1.47)

(86) PCT No.: PCT/EP2009/061783
§ 371 (c)(1),
(2), (4) Date: Jul. 28, 2011

(87) PCT Pub. No.: WO2010/029144
PCT Pub. Date: Mar. 18, 2010

(65) Prior Publication Data
US 2012/0013034 A1    Jan. 19, 2012

(30) Foreign Application Priority Data
Sep. 15, 2008  (DE) .......... 10 2008 047 210

(51) Int. Cl.
*B29C 47/20* (2006.01)
*B29C 47/86* (2006.01)
*B29C 47/90* (2006.01)

(52) U.S. Cl.
USPC .... 425/72.1; 425/296; 425/326.1; 425/379.1; 425/380; 425/467

(58) Field of Classification Search
USPC ......... 425/71, 72.1, 296, 326.1, 378.1, 379.1, 425/380, 467
See application file for complete search history.

(56) References Cited

U.S. PATENT DOCUMENTS

| 3,635,624 A | 1/1972 | Nakakoshi et al. |
| 3,649,143 A | 3/1972 | Papesh et al. |

(Continued)

FOREIGN PATENT DOCUMENTS

| DE | 1952 329 | 7/1970 |
| DE | 2727260 | 12/1977 |

(Continued)

OTHER PUBLICATIONS

International Search Report of PCT/EP2009/061783, mailed on May 31, 2010.

(Continued)

*Primary Examiner* — Yogendra Gupta
*Assistant Examiner* — Joseph Leyson
(74) *Attorney, Agent, or Firm* — Hamilton, Brook, Smith & Reynolds, P.C.

(57) ABSTRACT

An extrusion line for producing plastic profiles, preferably plastic pipes, comprising at least one extruder, one die, one calibration means and further following devices. The die has at least one aperture, and an extraction means arranged in front of the die as viewed in the extrusion direction, and the die consists of a plurality of functional regions with separate melt channels. Furthermore, the invention relates to increasing the cooling performance of an extrusion line for extruding a plastic profile, in particular a plastic pipe, which comprises the following steps, a) melting plastic in an extruder, b) shaping a plastic strand and feeding the plastic strand to a die, c) shaping a plastic profile by means of the die, and d) calibrating and curing by cooling the profile, the profile being cooled in the interior in addition to outer cooling.

10 Claims, 8 Drawing Sheets

(56) References Cited

U.S. PATENT DOCUMENTS

| | | | |
|---|---|---|---|
| T915,014 I4 * | 10/1973 | Goldman | 264/209.1 |
| 3,856,448 A | 12/1974 | Iijima et al. | |
| 3,907,961 A | 9/1975 | Carrow | |
| 4,484,883 A | 11/1984 | Honda et al. | |
| 6,551,534 B1 * | 4/2003 | Kirjavainen et al. | 264/37.17 |
| 8,523,552 B2 | 9/2013 | Hackl | |
| 2006/0288699 A1 | 12/2006 | Corbett, Jr. | |
| 2008/0131542 A1 * | 6/2008 | Diekhaus et al. | 425/72.2 |
| 2009/0174107 A1 | 7/2009 | Kössl | |
| 2010/0301526 A1 | 12/2010 | Hackl | |

FOREIGN PATENT DOCUMENTS

| | | |
|---|---|---|
| DE | 93 01 353.1 | 2/1994 |
| DE | 69403693 T2 | 9/1997 |
| DE | 199 46 689 A1 | 4/2000 |
| DE | 102005031747 A1 | 1/2007 |
| DE | 202007014876 U1 | 1/2008 |
| DE | 102007039799 B3 | 4/2009 |
| DE | 102007050291 A1 | 4/2009 |
| EP | 0079104 A1 | 5/1983 |
| EP | 0180571 A2 | 5/1986 |
| EP | 0515906 A2 | 12/1992 |
| EP | 595038 | 5/1994 |
| EP | 0795389 A1 | 9/1997 |
| JP | 56005750 A | 1/1981 |
| JP | 61 134220 | 6/1986 |
| JP | 62060626 A | 3/1987 |
| JP | 2270534 A | 11/1990 |
| SU | 1412985 | 7/1988 |
| WO | WO 97/38844 A1 | 10/1997 |
| WO | WO 2006/050549 A2 | 5/2006 |
| WO | WO 2008/064140 A2 | 5/2008 |

OTHER PUBLICATIONS

Written Opinion for PCT/EP2009/061783, mailed on May 31, 2010.

* cited by examiner

DEVICE FOOLING PLASTIC PROFILES

DEVICE FOR COOLING PLASTIC PROFILES

This application is the U.S. National Stage of International Application No. PCT/EP2009/061783, filed Sep. 10, 2009, which designates the U.S., published in German, and claims priority under 35 U.S.C. §§119 or 365(c) to Germany Application No. 10 2008 047 210.7, filed Sep. 15, 2008.

The invention relates to an extrusion line for producing plastic profiles, preferably plastic pipes, comprising at least one extruder, one die, one calibration means and further following devices.

Furthermore, the invention relates to a method for increasing the cooling performance of an extrusion line for extruding a plastic profile, in particular a plastic pipe, which method comprises the following steps: a) melting of plastic in an extruder, b) shaping of a plastic strand and feeding of the plastic strand to a die, c) shaping of a plastic profile by means of the die, d) calibrating and curing by means of cooling of the profile in a calibration means, the profile being cooled in the interior in addition to the outer cooling in the calibration means.

Possibilities of pipe inner cooling are known from the prior art. Thus, for example, DE 69 403 693 proposes to provide the inner wall of the pipe with a spray mist and, as a result, to achieve evaporation of the liquid on the inner wall of the pipe and therefore to achieve cooling. However, cooling means of this type have not proven practical, since the hot water vapor is entrained in the extrusion direction and, although it thus assists the cooling of the pipe in the calibration means, it keeps the pipe at a temperature at the end of the extrusion line, for example in the region of the saw, with the result that, although said pipe is dimensionally stable, it is too soft for the separating process.

In order to produce pipes, plastic is melted in an extruder and is pressed through a corresponding die. In a subsequent calibration means, the external diameter which is produced in this way is frozen and the heat is removed from the plastic via the outer surface in water spray baths or full baths. Here, the entire heat has to be guided to the outside through the plastic wall, where it is then dissipated by the cooling water. As the pipe wall thickness increases, the cooling length becomes disproportionately longer, since the plastic is a poor thermal conductor. In addition, the temperature in the interior of the pipe remains at a high level for a long time and the plastic has sufficient time to flow away on account of gravity. The result is that the pipe wall thickness in the upper region is always smaller than in the lower region.

This process therefore has two disadvantages as the pipe wall thickness increases. The cooling length becomes disproportionately longer and the plastic flows away on the inner wall, and the consequence is a non-uniform wall thickness distribution. In order to reduce these disadvantages, a plurality of systems for pipe inner cooling as from EP 795 389 is known. However, the efficiency of said systems is very limited. Since the pipe is cooled both on the outside and on the inside, both the outer contour and the inner contour are frozen. If the melt in the center of the pipe wall then solidifies as a result of heat dissipation to the outside and to the inside, shrink holes are produced as a result of the pronounced volumetric reduction during the transition from the melt state into the solid state. This risk becomes greater as pipe wall thicknesses become thicker.

JP 56-005 750 A has disclosed an apparatus for extruding plastic profiles, to which apparatus plasticized plastic compound can be fed and which apparatus has a plurality of annular channels which are combined to form a common melt channel. Cooling channels are arranged around said annular channels.

DE 10 2005 031 747 A1 has disclosed a method for the inner cooling of hollow plastic profiles and an extruder for producing hollow plastic profiles. Here, the inner cooling is achieved by the fact that a cooling gas is guided into the interior of the hollow profile, the cooling gas being produced in a Ranque-Hilsch vortex tube.

It is an object of the present invention to provide an extrusion line and a method, in which more energy efficient extrusion is made possible and the heat can be dissipated as uniformly as possible over the entire wall thickness of the pipe, the cooling performance being increased in the extrusion line with the aim of increasing the throughput and/or of shortening the cooling section, or making it possible in the case of the method to increase the cooling performance and therefore either to increase the throughput or to shorten the cooling section.

The solution of the objects is shown in the claims.

The aperture achieves a situation where extraction counter to the extrusion direction is made possible and the heat which is present in the interior of the profile can be extracted from the process. Depending on the nature of the die, there can also be a plurality of apertures.

The extracted warm air is advantageously fed to a consumer for energy recovery.

This counterflow principle has the advantage that, in comparison with the pipe temperature at the end of the extrusion section, colder air is sucked through the pipe interior counter to the extrusion direction. This air is heated on the pipe inner wall on its path through the pipe, the pipe temperature likewise increasing counter to the extrusion direction. There is therefore always a temperature difference between the air and the pipe inner wall, which results in a permanent heat flow from the pipe into the air. The heat which is extracted from the process in this way is fed to the process again and contributes to the energy optimization. The heat is therefore utilized appropriately and does not disappear into the atmosphere.

In principle, blowing in the extrusion direction is also possible.

The aperture can be formed by means of a pipe which is guided through the die. In order that a temperature separation is produced between the actual die and the aperture, that is to say the inserted pipe, there is provision according to one development for there to be an air gap between the pipe and the die. Depending on the nature of the die, there can also be a plurality of apertures.

As a result of said aperture, it then becomes possible to guide air in the counterflow method. Here, a thermal exchange occurs between the air and the extruded pipe, which air is then sucked through the die in the interior. Ideally, this discharged heat is utilized for energy recovery. Several use areas are conceivable. For example, the plastic raw material can be preheated or a Stirling engine can be driven.

The abovementioned functional regions are not necessarily to be considered to be closed regions; they can merge flowingly into one another and therefore also overlap one another.

There is provision according to one development for the aperture also to be situated in the extruder, the extraction means being arranged in front of the extruder as viewed in the extrusion direction. The further extent of the aperture from the die and in the extruder makes a more flexible design of the extraction apparatus itself possible, since the extraction means can be arranged in the relatively free space of the extrusion line and does not have to be positioned between the extruder and the die. As an alternative, there is the possibility to arrange the extruder transversely with respect to the extrusion direction and therefore to feed the plastic melt to the die from the side.

The volumetric flow advantageously can be regulated and/or controlled. It therefore becomes possible to adapt the extraction apparatus to the respective extrusion conditions. The corresponding strength of the extraction process can therefore be adapted to the respective temperature conditions and therefore to the cooling requirement during the process. The greater the cooling performance which is required, the greater or higher the volumetric flow is to be set.

As a further alternative or in addition, it is proposed that the extraction means can be operated intermittently. Air is therefore extracted for a time period t1, as far as possible in the turbulent range, followed by a time period t2, during which extraction does not take place (tempering time). The heat can thus migrate again from the center of the pipe wall to the inner side, as a result of which the pipe becomes warmer again on the inner side. This is followed again by a time period t1, in which the heat is extracted. The entire process can be repeated multiple times.

As an alternative, it is proposed that a chamber is arranged around the extruded pipe following the calibration means, a fan being arranged on the chamber, by means of which fan air can be guided past the outer wall of the extruded pipe counter to the extrusion direction.

It is also of advantage here if the air which is heated in this way is fed to a consumer for energy recovery.

Either extraction or blowing through of the air counter to the extrusion direction is made possible by way of the fan and, as a result, the heat which is present at the outer wall of the profile can be removed from the process. It goes without saying that the entire process can also be operated in the extrusion direction.

The chamber is advantageously sealed at least on one side.

It is proposed to use a preheating station for the raw material to be fed to the extruder as consumer, to which the heat is fed. Plastic granulate is primarily used as raw material; however, said heat can also be used to preheat other materials, such as PVC powder. This has the advantage that the raw material already has a higher temperature than room temperature and therefore less energy has to be applied in the extruder in the form of thermal energy. This also applies, in particular, to the mechanical energy which is introduced. In the case of a single screw extruder, for example, the thermal energy which is applied via the cylinder wall is not so relevant for melting, since here, above all, the mechanical energy (drive energy) is converted into frictional heat.

It goes without saying that the temperature must not lie in a range, in which the plastic granulate which is used already agglutinates. This can be controlled, for example, by the fact that the volumetric flow of the extraction apparatus can be controlled and/or regulated, but also by the fact that the energy which is not required to heat the material is fed to a heat exchanger and/or is used to drive further assemblies, for example a Stirling engine, and/or to produce process cooling. It of course goes without saying that the extracted heat can also be used exclusively only for the drive of the assemblies.

It is proposed for the method for the inner cooling of the profile, the air is sucked through counter to the extrusion direction by means of an extraction means and the plastic strand is divided in the die into a plurality of part strands in an assisting manner and thus the temperature of the melt is reduced before exit from the die.

In order to achieve as high as possible a cooling performance by means of the extraction apparatus in the interior of the profile, there is provision according to one development for at least one flow speed which is situated in the turbulent range to be achieved by means of the extraction means. This turbulent flow achieves as satisfactory as possible a swirl of the air in the interior of the profile, which leads to a high exchange of the air at the inner wall of the profile and therefore results in a satisfactory cooling performance.

The temperature can therefore be reduced by at least from 10° C. to 50° C., there being provision for the temperature to be reduced by at least from 20° C. to 40° C., preferably by 30° C.

The temperature of the plastic melt is therefore reduced at least in the transition range between the melt state and the partially crystalline state in the case of partially crystalline plastics or in the transition range between the melt state and the glass state in the case of amorphous plastics; it should be heeded that the temperature reduction takes place only to such an extent that fusing between the individual layers is ensured.

This temperature reduction can be assisted by a counter-flow method, in which the heat which is produced in the interior of the pipe is sucked through the die.

There is provision according to one development for the plastic melt to flow through three functional regions, the three functional regions merging flowingly into one another. The melt or a melt particle can therefore still be situated in the distributing region but also already in the cooling region. The same applies to the transition between the cooling region and the shaping region.

The proposed method and the apparatus according to the invention are particularly suitable for producing thick-walled pipes.

In a further development, there is provision in terms of the method for the air volume between the extraction means and the end of the extrusion line to be exchanged at least once, preferably twice per minute. It is therefore proposed to exchange the air volume correspondingly often within the entire pipe region within the extrusion line, that is to say from the extraction means via the extruder or the die along the calibration means and the pull-off means or further following devices as far as the separating device, on which the entire profile strand is cut to length, in order to achieve an optimum cooling performance.

There is provision in a further development to operate the extraction means intermittently. Air is therefore extracted for a time period t1, as far as possible in the turbulent range, followed by a time period t2, in which extraction is not carried out (tempering time). The heat can thus again migrate from the center of the pipe wall to the inner side, as a result of which the pipe becomes warmer again on the inner side. This is followed again by a time period t1, in which the heat is extracted. The entire process can be repeated multiple times, and the intermittent extraction can be controlled as a function of temperature, time or volumetric flow.

For an embodiment of this type, it is necessary that the separating apparatus carried out chipless separation at least in the region of the wall thickness, in which it cuts the plastic pipe to length in its entirety, in order to suppress chips being sucked by means of the extraction means in the direction of the die, and said chips can then adhere in the interior of the pipe in the region, in which the surface of the pipe is still too warm.

The proposed extrusion line and the proposed method are suitable, in particular, for thick-walled plastic pipes and pipes with large to very large diameters, the dwell time of which within the extrusion line lies in the range of hours, and is therefore relatively long.

The cooling performance is increased in an extrusion line by means of the proposed invention, with which two considerable advantages are associated. Firstly, the overall cooling length is shortened if an existing throughput performance is left unchanged, or the throughput performance can be increased as long as the overall cooling length is retained.

The throughput and cooling length are physically linked to the cooling time. The cooling time is dependent on the cooling performance. As a result of the increase in the cooling performance and therefore the reduction in the cooling time, the cooling section can be shortened with a constant throughput or the throughput can be increased with a constant cooling section, as described above.

As a rule, an extrusion line is provided for a defined throughput. In the case of a constant throughput, the extrusion line according to this invention is shorter than a line known in the prior art (example A). If, conversely, two extrusion lines of the same length are compared, one which corresponds to the prior art and one according to this invention, a greater throughput can be achieved on the line according to the invention (example B).

If, according to example A, two lines with an equally long extruder are compared, the one which corresponds to the prior art would be longer than the line according to the present invention. In example B, two lines with an identical cooling section are compared; the one which corresponds to the prior art has a smaller extruder, and the one which corresponds to the invention has a larger extruder.

In this method, for the inner cooling of the profile, the air is sucked through counter to the extrusion direction by means of an extraction means.

As an alternative, for the outer cooling of the profile, it is proposed to guide the air through a chamber past the outer wall of the extruded pipe counter to the extrusion direction by means of a fan.

The air is fed to a consumer in order to utilize the heat. As has already been described above, the preheating of granulate or the operation of assemblies, just like the feeding to a heat exchanger or to produce process cooling are provided as consumers.

As has already been mentioned above, the operation using the counterflow principle has the advantage that, in comparison with the pipe temperature at the end of the extrusion section, colder air is sucked through the pipe interior counter to the extrusion direction. Said air is heated on the pipe inner wall on the path through the pipe, the pipe temperature likewise increasing counter to the extrusion direction. There is therefore always a temperature difference between the air and the pipe inner wall, which results in a permanent heat flow from the pipe to the air.

In order to achieve as high as possible a cooling performance, there is provision according to one development for at least one flow speed to be achieved which is situated in the turbulent range. This turbulent flow achieves as satisfactory as possible swirling of the air in the interior and/or on the outer wall of the profile, which leads to a high exchange of the air at the inner and/or outer wall of the profile and results in a satisfactory cooling performance.

In an assisting manner, there is provision according to one development for not only the heat which prevails in the interior of the pipe to be extracted partially via the air and fed to the consumer, but also for the air on the circumference of the pipe to be guided along the pipe, preferably counter to the extrusion direction, which air is heated as has already been described above and in the process also extracts heat from the pipe and the outer diameter and feeds said heat to the consumer.

The methods are particularly appropriate in the case of the extrusion of a thick-walled plastic pipe, since relatively long dwell times of the extrudate in the line are required here and therefore the air volume can be exchanged multiple times, which results in particularly high efficiency.

It is also proposed that heat which accumulates in or on the extruded pipe is fed to the extrusion process again, by air being guided along the surface of the extruded pipe counter to the extrusion direction, and the obtained quantity of heat being utilized to preheat the plastic granulate which is required for the extrusion process or to drive assemblies such as a Stirling engine or to produce process cooling.

The proposed extrusion lines and the proposed methods are suitable, in particular, for thick-walled plastic pipes and pipes with large to very large diameters, the dwell time of which within the extrusion line lies in the range of hours, and is therefore relatively long.

The cooling performance in an extrusion line is increased by means of the proposed invention, with which considerable advantages are associated. Firstly, the overall cooling length is shortened if an existing throughput performance is left unchanged, or the throughput performance can be increased as long as the overall cooling length is retained. Furthermore, energy efficient extrusion of a plastic profile is therefore achieved, since the energy which is extracted from the profile is fed at least partially to the process again.

The extracted air does not influence the melting behavior in the extruder, since it does not come into contact with the extruder. In solutions which are known in the prior art, the air is sucked through the extruder and measures are taken that give no influence. Particularly effective cooling is achieved as a result of the proposed turbulent flow.

In addition to the inner air extraction, there is provision also or as an alternative for air preferably, but not exclusively, to be guided in counterflow over the pipe on the outside. The advantage consists in that a much larger quantity of heat can be extracted from the pipe, which heat can be recycled again partially. The air cooling on the pipe outer diameter can also be used on its own.

Cooling with full water tanks or spray water tanks is known in the prior art. In the case of existing systems, in particular, the outer air cooling means can be an effective retrofitted system, even if the pipe inner cooling is not possible on account of a missing aperture in the pipe head.

It is an aim to keep as high as possible a percentage of the accumulating heat in the system, not only via preheating, but also, for example, via conversion into mechanical drive energy.

In the die, the shaping nozzle is divided at the circumference into individual segments, each segment having both a heating device and a cooling device.

As a result of this embodiment, it is then possible to control the temperature of the die in a targeted manner, since not only heating, as in the prior art, but also cooling can take place.

There is provision according to one development for not only the shaping nozzle, but also in addition the shaping mandrel to be divided into individual segments which have a heating device and a cooling device.

This makes it possible to influence the wall thickness distribution in an improved manner. According to one development, the temperature can be controlled or regulated in every individual segment, both in the shaping nozzle and in the shaping mandrel.

The individual segments are assigned different temperatures, it being possible for each segment to be both heated and cooled.

The effect of thermal centering is improved decisively if the individual segments are not only heated, but also cooled. In this way, a zonal temperature can be achieved which lies considerably below the melt temperature. It is therefore possible to have a decisive influence on the flow behavior, and therefore to change the wall thickness in a segment by segment manner. The effect is additionally increased if, as stated above, not only the nozzle can be heated and cooled in a segment by segment manner, but also the mandrel.

Two exemplary embodiments of the invention are shown diagrammatically in the drawings, in which.

Figure 1:
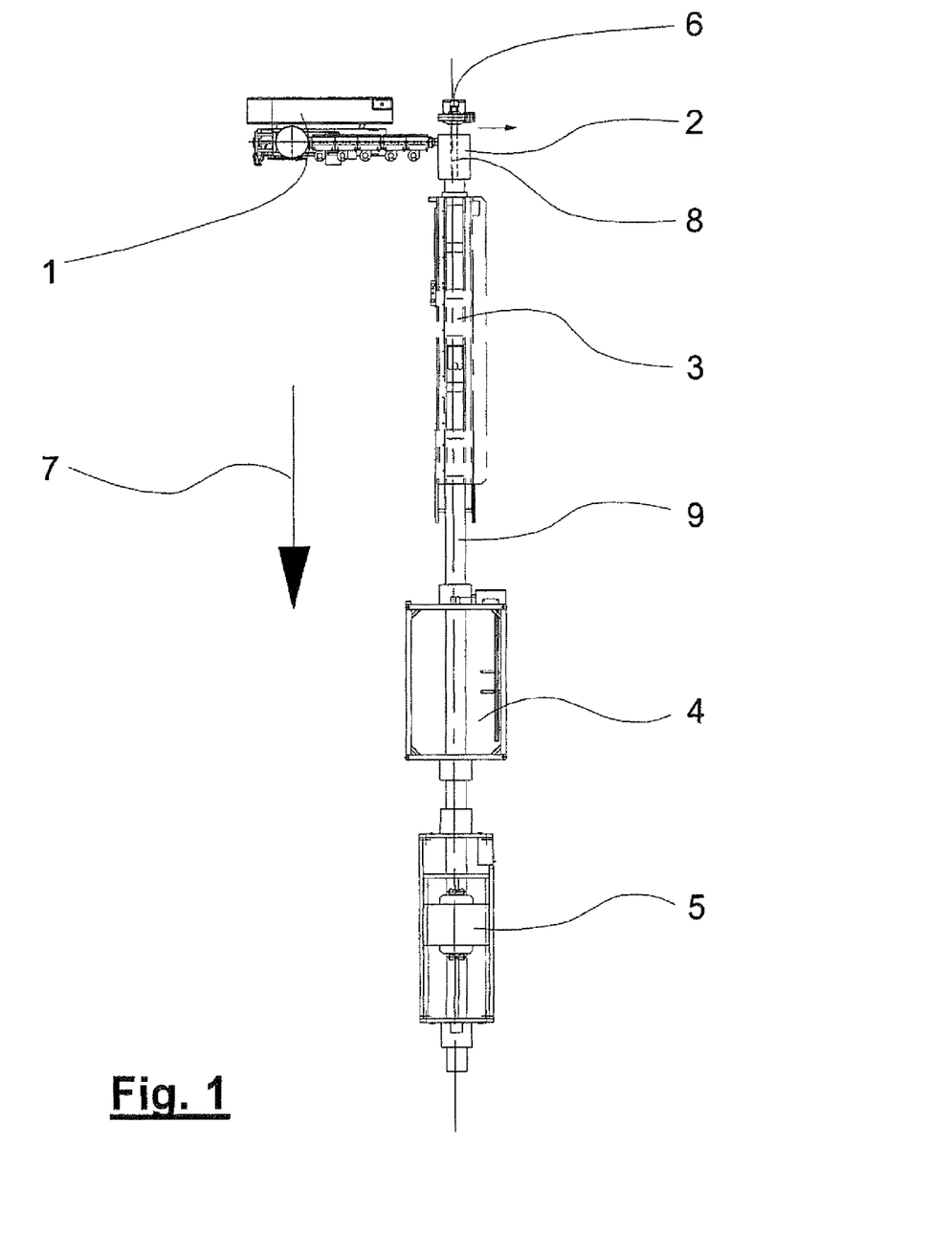
FIG. 1 shows an extrusion line.

FIG. 1 diagrammatically shows an extrusion line, the extruder 1 being arranged on the side of the extrusion die 2. As viewed in the extrusion direction 7, the die 2 is adjoined by the calibration means 3 which in turn is followed by the pull-off means 4. The calibration means 3 comprises a vacuum tank with an installed calibration sleeve. Further cooling baths can also adjoin the calibration means.

This is adjoined by a further following device, here a separating apparatus in the form of a saw 5. A pipe 9 is produced in the extrusion line which is shown by way of example. The extraction means 6 is arranged at the start of the extrusion line, directly at the die. The corresponding extraction direction is indicated diagrammatically by the arrow.

The die 2 has an aperture 8; the aperture 8 is connected to the extraction means 6, with the result that the extraction means 6 can suck through the air volume in the interior of the pipe 9 as far as the end of the extrusion line in the region of the separating apparatus 5.

Figure 2:
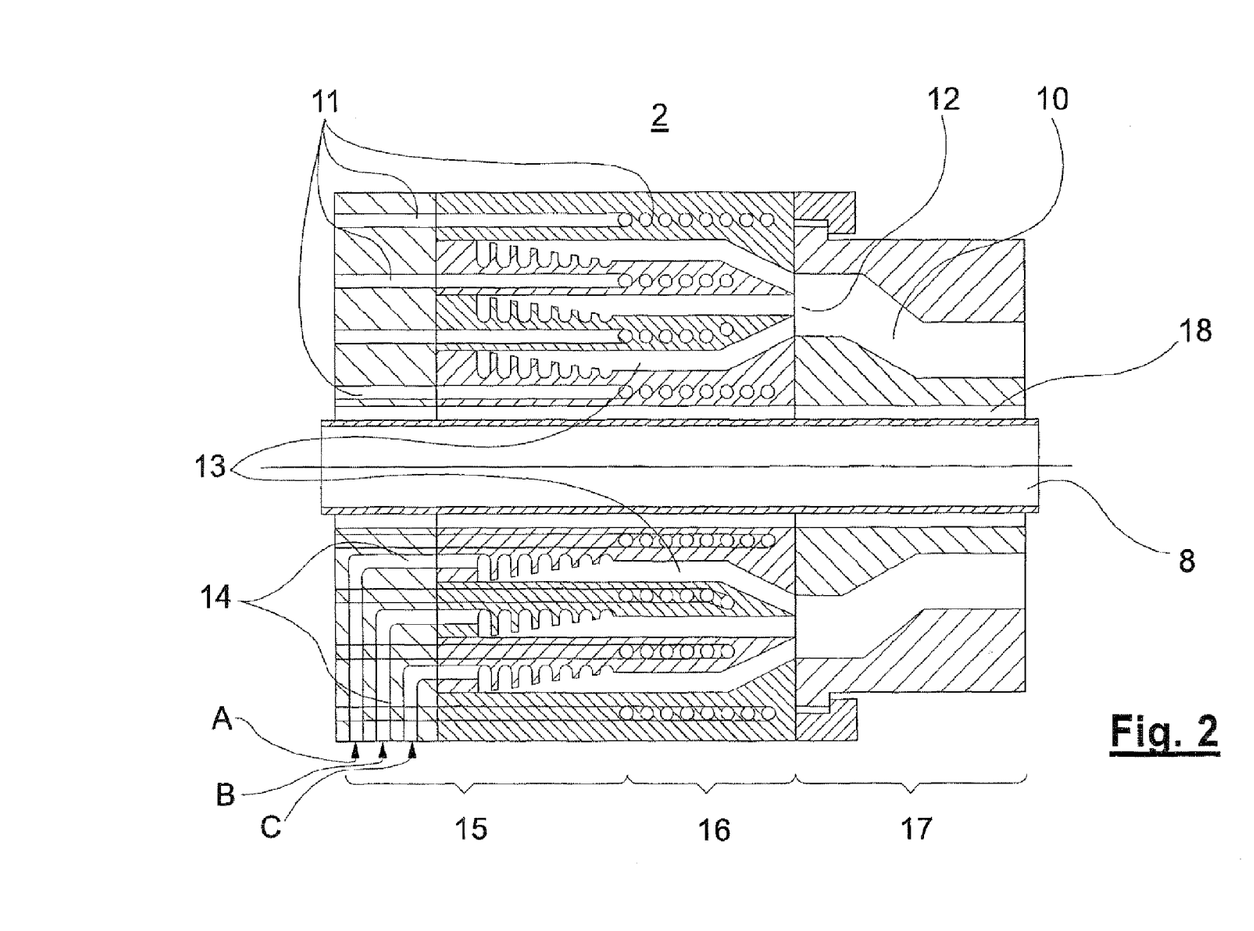
FIG. 2 shows a section through the die.

FIG. 2 shows a die 2 according to the invention. The actual melt channel 10, by means of which the plastic profile is extruded, forms the final part of an overall die. The center part of the die 2 consists of a plurality of annular channels 13 which are combined at a converging point 12 and form the start of the common melt channel 10. The individual annular channels 13 which are connected to feed channels 14 are supplied with plasticized plastic compound from the extruder 1 (not shown in this figure). Cooling channels 11 which are connected to a cooling circuit (likewise not shown) are arranged between the annular channels 13. The cooling channels are arranged in such a way that they can extract heat as uniformly as possible from the existing material mass of the die. The die is therefore divided into the three functional regions of distributing region 15, to which the melt is fed from the extruder or extruders at the points A, B, C of the feed channels 14 and is divided up into the annular channels 13; cooling region 16, in which the annular channels 13 are provided with cooling channels 11; and the shaping region 18, in which the precooled melt converges. In order to dissipate the heat from the interior of the pipe, an aperture 8 is provided in the die 2 by means of a pipe. An air gap 18 is provided for temperature separation between the pipe 8 and the actual die 2.

Figure 3:
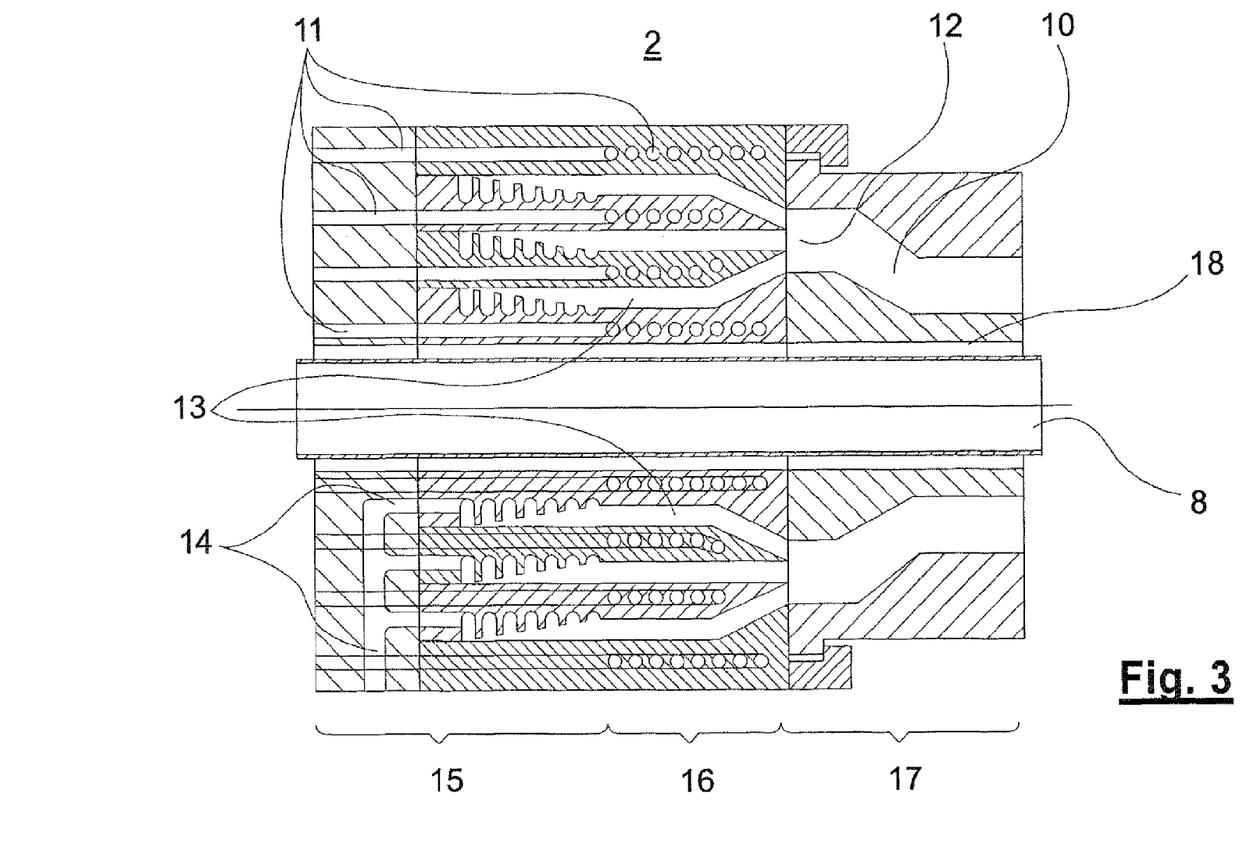
FIG. 3 shows the subject matter according to FIG. 2, in an alternative embodiment.

FIG. 3 shows an alternative embodiment of the invention. It differs from the embodiment according to FIG. 2 in that the melt is fed centrally, that is to say only via one extruder. A section through the die 2 is therefore shown, in which the actual melt channel 10 can be seen again, by means of which the plastic profile is extruded. Here too, it forms the end part of an overall die. Here too, the center part of the die 2 consists of a plurality of annular channels 13 which are combined at the converging point 12 and form the start of the common melt channel 10. The individual annular channels 13 are connected to the feed channels 14. It can be seen clearly that the feed channels 14 are flowed into centrally by an extruder 1 (not shown) and are then divided up into the three helical distributors. Here too, cooling channels 11 which are connected to a cooling circuit (likewise not shown) are arranged between the annular channels 13. It goes without saying that the cooling channels are again arranged in such a way that they can extract heat as uniformly as possible from the existing material mass of the die. Here too, the die 2 is divided into the three functional regions of distributing region 15, cooling region 16 and shaping region 18. An aperture 8 by means of a pipe is also provided in the die 2 in this embodiment for dissipating the heat from the interior of the pipe. An air gap 18 is provided again between the pipe 8 and the actual die 2 for temperature separation.

It is to be noted that, both in accordance with the embodiment according to FIG. 2 and also in accordance with the embodiment according to FIG. 3, each annular channel 13 can be loaded with one and the same plastic compound or else with different plastic compounds. To this end, only the feed channel 14 is to be modified, with the result that each feed channel is assigned, for example, to a dedicated extruder 1. Therefore, for example, different color layers can be produced in the pipe, or else two materials with different properties can be produced. It is therefore possible, for example, to load the center part with a recyclate which is then enclosed with higher quality material on both sides in the finished part.

Figure 4:
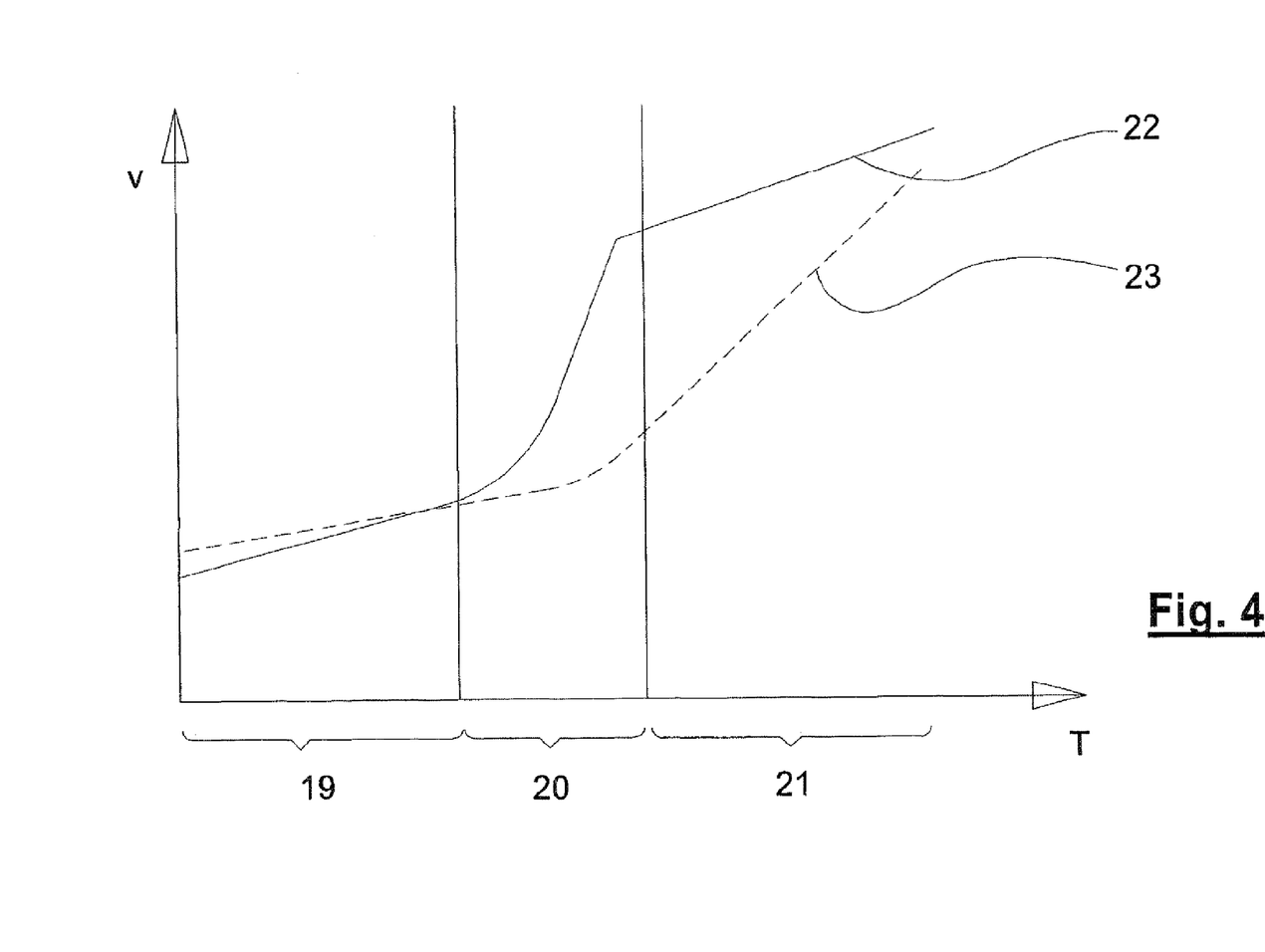
FIG. 4 shows the individual temperature ranges.

FIG. 4 diagrammatically shows a curve progression of a partially crystalline and an amorphous plastic, the specific volume v being plotted against the temperature T. The solid line 22 shown represents by way of example the partially crystalline material, and the dashed line 23 represents an amorphous plastic. It is therefore to be ensured during cooling that the temperature is cooled from the melt state, shown in region 21, at least into the transition region 20, but that the cooling does not take place to such a great extent that the solid region 19 is reached. In the solid region 19, a partially crystalline state prevails in partially crystalline plastics and a glass state prevails in amorphous plastics.

A consumer 24 is arranged on the extraction means 6, which consumer 24 is, by way of example, a preheating station here for the plastic granulate which is to be fed to the extruder 1. However, a Stirling engine can equally be operated with this, which Stirling engine in turn actuates the pull-off means 4 or other drives of the extrusion line.

The extraction means can be operated intermittently. Air is therefore extracted for a time period t1, as far as possible in the turbulent range, followed by a time period t2, in which extraction is not carried out (tempering time). The heat can therefore again migrate from the center of the pipe wall to the inner side, as a result of which the pipe becomes warmer again on the inner side. This is followed again by a time period t1, in which the heat is extracted. The entire process can be repeated multiple times. An analogous situation applies to the air flow along the outer wall of the profile in the case of outer cooling.

Figure 5:
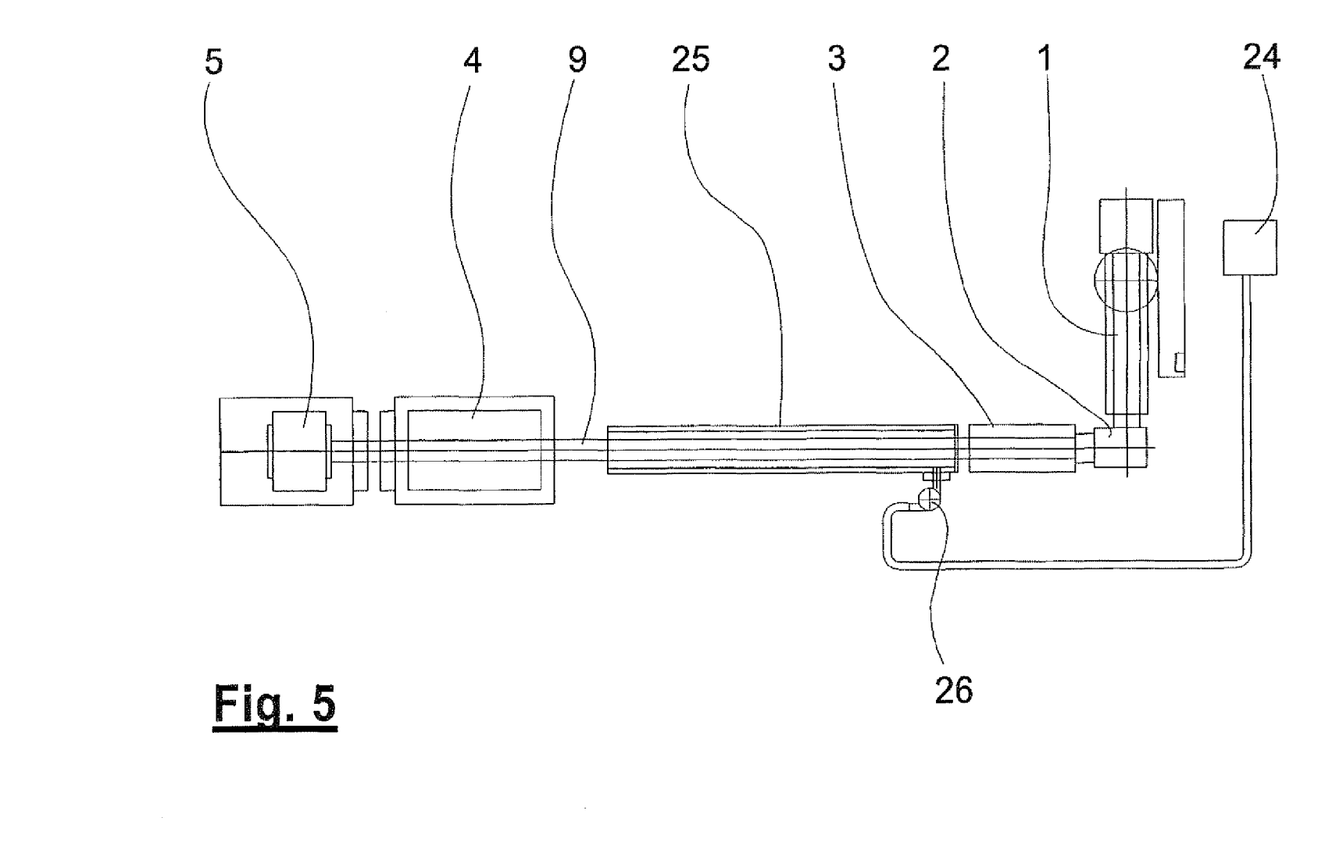
FIG. 5 shows outer cooling of the profile.

FIG. 5 diagrammatically shows outer cooling of the extrusion line which is shown in FIG. 1 by way of example and once again consists of the extruder 1, the die 2, a calibration means 3, the pull-off means 4 and a separating apparatus 5. A chamber which is once again connected to a fan 26 is arranged around the extruded pipe 9 between the calibration means 3 and the pull-off means 4. The chamber is appropriately sealed with respect to the calibration means 3, with the result that extraction counter to the extrusion direction can be carried out by means of the fan 26. The air which is situated in the space is therefore sucked in at the end of the chamber, that is to say opposite the pull-off means 4, is sucked through along the surface of the pipe 9 counter to the extrusion direction to the exit of the chamber 25, that is to say where the fan 26 is arranged, and is heated on this section and at the same time the outer wall of the pipe 9 is cooled. The air which is heated in this way is fed via the connecting pipes to the consumer 24.

Figure 6:
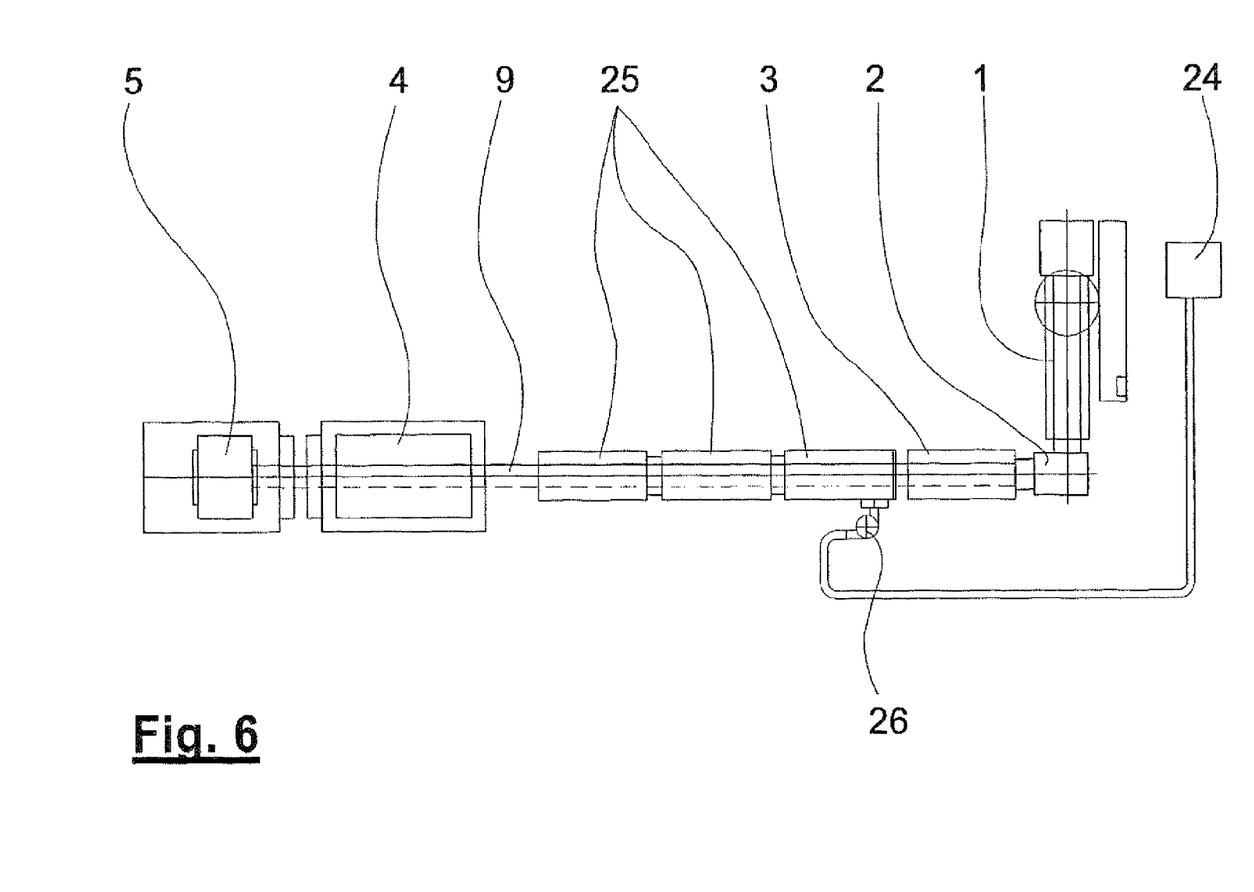
FIG. 6 shows an alternative to FIG. 5.

FIG. 6 shows a similar embodiment, in which once again an extrusion line is shown with an extruder 1, an extrusion die 2, the calibration means 3, the pull-off means 4 and a separating apparatus 5. As has already been described with respect to FIG. 1, further cooling baths can be arranged next to the calibration means. This is shown here in FIG. 3 by way of example by way of three cooling baths. Said cooling baths are arranged in such a way that there is a connection between them and once again a fan is arranged at the first cooling bath after the calibration means 3, as viewed in the extrusion direction. Each of said cooling baths is configured in such a way that once again a chamber 25 is produced around the pipe 9. As has already been described in FIG. 5, the compartment air can then be sucked in via the fan 26 on the end face of the chamber 25 which lies opposite the pull-off means 4, and is sucked through along the surface of the pipe 9 in the direction of the fan 26, counter to the extrusion direction. Here too, the air is heated on said path and is fed via the connecting pipes to the consumer 24.

This proposed embodiment is conceivable, for example, in existing pipe extrusion lines, in which the existing cooling baths can be converted into chambers of this type by simple modification and the existing cooling connections can be connected to the fan 26. It goes without saying that it is also conceivable here to arrange the pipe connection to the consumer 24 exactly on the other side of the chambers 25, that is to say just in front of the pull-off means 4, and then not to suck the air through, but rather to blow it through. This would mean that, in the exemplary embodiment according to FIGS. 5 and 6, the fan 26 then sucks in the compartment air and blows it through the chambers along the surface of the pipe 9, where it is fed to the connecting pipes at the other end and is forwarded to the consumer 24.

Figure 7:
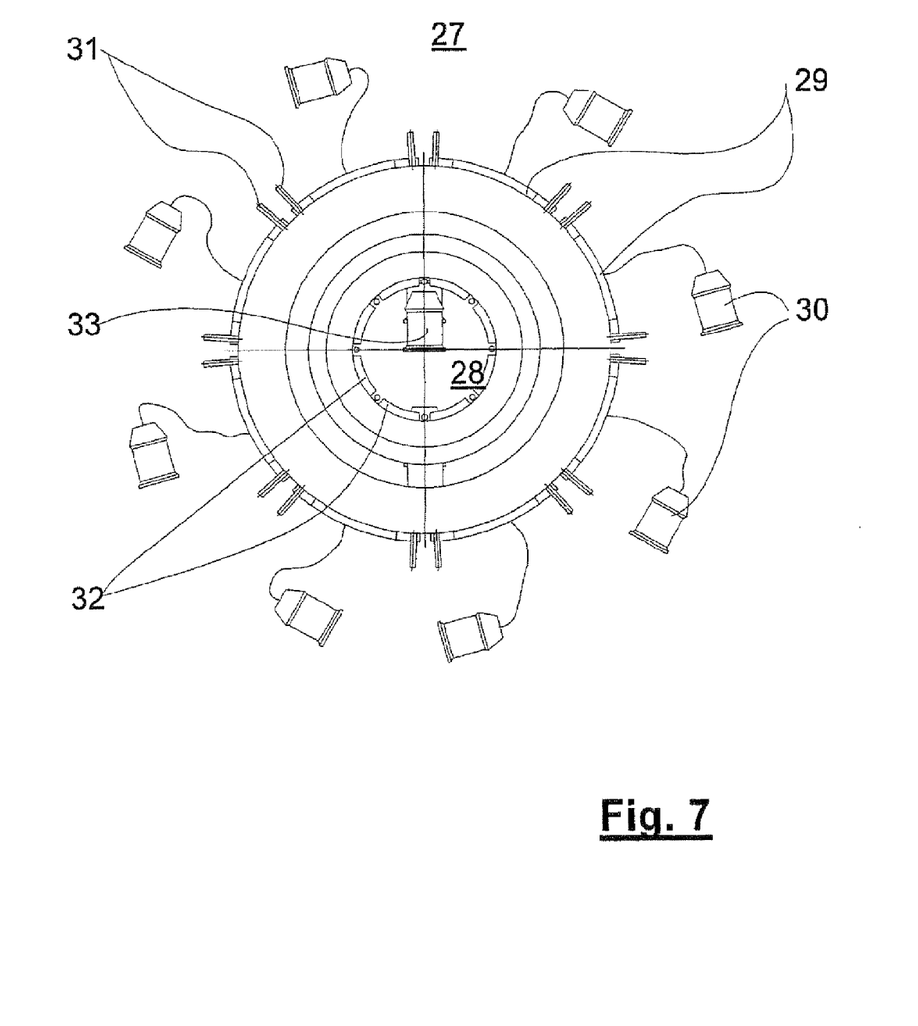
FIG. 7 shows the die with the segments.

FIG. 7 shows the shaping part of the die in detail. A view is shown of the die along the extrusion direction 7, that is to say of the mandrel 28 and the nozzle 27. The nozzle 27 is divided at the circumference into a plurality of segments 10 which have both a heating device 30 and a cooling device 31. Said heating device 30 and cooling device 31 can be controlled or regulated in such a way that each of the segments 10 can be loaded with different temperatures. As a result of said different temperatures, it becomes possible to homogenize the wall thickness of the pipe.

The whole thing is assisted by the fact that there is provision according to the invention for not only the shaping nozzle 27 but also the shaping mandrel 29 to be divided at the circumference into segments 13. These segments 13 also have a heating device 33 and a cooling device 34, as can be seen in FIG. 3.

FIG. 8 again shows the shaping part of the die and is an illustration in a section through the die, the section extending through the extrusion axis 36.

Figure 8:
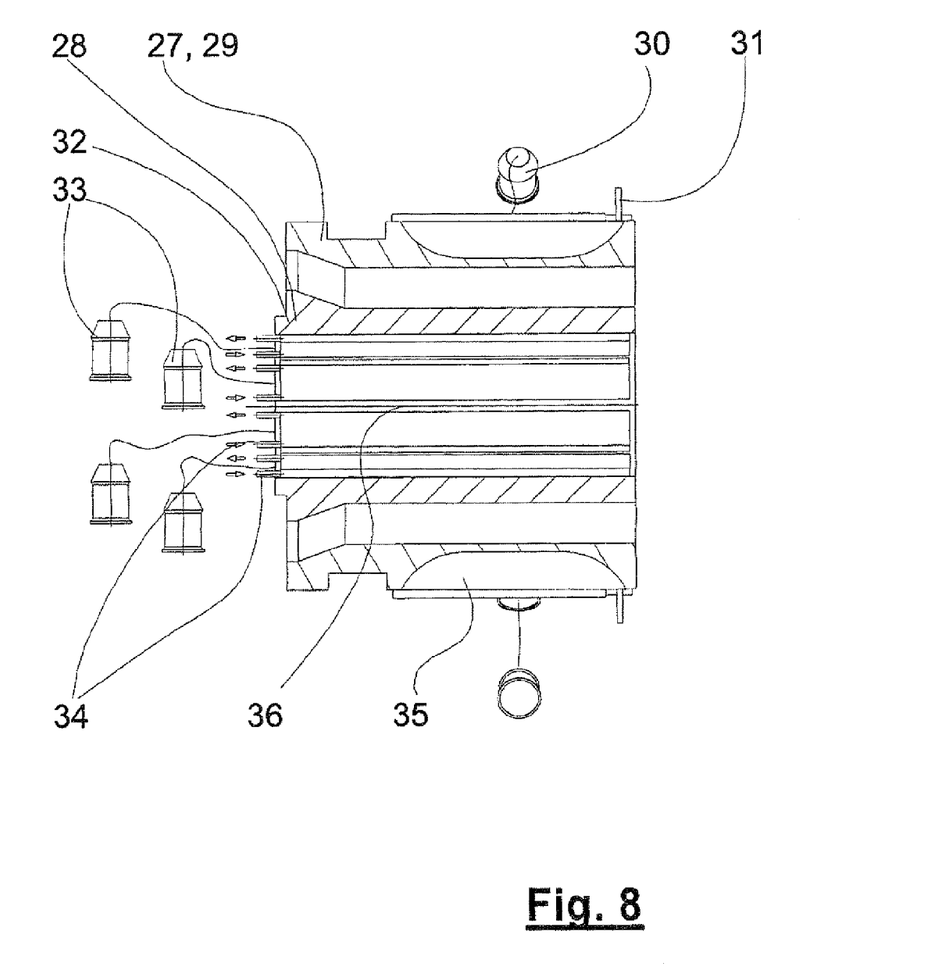
FIG. 8 shows the die according to FIG. 7, in a section parallel to the extrusion direction.

In order to obtain thermal separation between the segments 10, each segment is partially cut out, with the result that a type of slot is produced, as can be seen in the sectional illustration of FIG. 8. Reference is made to said slot as item 16.

However, it is equally possible, for example, to operate each of the zones with a heating/cooling circuit. Temperature control is therefore carried out with liquid, and no separation is therefore required with different assemblies between heating and cooling.

By way of the proposed method and the proposed apparatus, it is therefore possible in a simplified way to dissipate heat uniformly over the entire wall thickness of the pipe.

| List of Designations: | |
|---|---|
| 1 | Extruder |
| 2 | Die |
| 3 | Calibration means |
| 4 | Pull-off means |
| 5 | Separating apparatus |
| 6 | Extraction means |
| 7 | Extrusion direction |
| 8 | Aperture |
| 9 | Plastic profile |
| 10 | Melt channel |
| 11 | Cooling channel |
| 12 | Converging point |
| 13 | Annular channel |
| 14 | Feed channel to 13 |
| 15 | Distributor region of 2 |
| 16 | Cooling region of 2 |
| 17 | Shaping region of 2 |
| 18 | Air gap |
| 19 | Solid region |
| 20 | Transition region |
| 21 | Melt state |
| 22 | Curve, partially crystalline plastic |
| 23 | Curve, amorphous plastic |
| 24 | Consumer |
| 25 | Chamber |
| 26 | Fan |
| 27 | Nozzle |
| 28 | Mandrel |
| 29 | Segment of 27 |
| 30 | Heating device of 29 |
| 31 | Cooling device of 29 |
| 32 | Segment of 28 |
| 33 | Heating device of 22 |
| 34 | Cooling device of 22 |
| 35 | Slot in 29 |
| 36 | Extrusion axis |
| v | Specific volume |
| T | Temperature |

The invention claimed is:

1. An extrusion line for producing plastic profiles, preferably plastic pipes, comprising at least
one extruder,
one die,
one calibration means,
and further following devices,
at least the die has at least one aperture, and an extraction device is arranged in front of the die as viewed in the extrusion direction, by means of which extraction device air in the interior of the plastic profile can be exchanged,
the die consisting of a plurality of functional regions with separate melt channels, by means of which the plastic melt can be divided into part melts and the temperature of the melt can be reduced and then recombining and fusing together,
a chamber being arranged around the extruded pipe downstream from and sealed with respect to the calibration means,
a fan being arranged on the chamber, by means of which fan air can be sucked in at an end of the chamber opposite to where the fan is arranged and guided past the outer wall of the extruded pipe counter to the extrusion direction for additional cooling, the chamber being downstream from the calibration means and after fusing between the part melts when recombined, the die comprising at least one shaping nozzle and one shaping mandrel, and the shaping nozzle being divided at the circumference into individual segments, each segment having both a heating device and a cooling device.

2. The extrusion line as claimed in claim 1, in which volumetric flow of the extraction device can be regulated and/or controlled and/or can be operated intermittently.

3. The extrusion line as claimed in claim 1 in which a chipless separating apparatus is used as separating apparatus at least in the region of the wall thickness, in which it cuts the plastic pipe to length in its entirety.

4. The extrusion line as claimed in claim 1 in which the aperture is formed by means of a pipe which is guided through the die, and there is an air gap between the pipe and the die.

5. The extrusion line as claimed in claim 1 in which the shaping mandrel is divided at the circumference into individual segments, each segment having both a heating device and a cooling device.

6. The extrusion line as claimed in claim 1 in which temperature of the individual segments can be controlled or regulated independently of one another.

7. The extrusion line as claimed in claim 1 in which extracted warm air can be fed to a consumer for energy recovery.

8. The extrusion line as claimed in claim 1 in which the chamber is sealed at least on one side.

9. The extrusion line as claimed in claim 7 in which the consumer is a heat exchanger, a preheating station for the raw material to be fed to the extruder, a Stirling engine or an absorption cooling machine.

10. The extrusion line as claimed in claim 1 in which the plurality of functional regions overlap one another.

* * * * *

UNITED STATES PATENT AND TRADEMARK OFFICE
CERTIFICATE OF CORRECTION

PATENT NO. : 8,702,410 B2  Page 1 of 1
APPLICATION NO. : 13/062885
DATED : April 22, 2014
INVENTOR(S) : Hackl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 439 days.

Signed and Sealed this
Twenty-ninth Day of September, 2015

Michelle K. Lee
*Director of the United States Patent and Trademark Office*